US012669841B2

(12) United States Patent
Miyamoto et al.

(10) Patent No.: US 12,669,841 B2
(45) Date of Patent: Jun. 30, 2026

(54) CONTROL DEVICE FOR SOLAR POWER GENERATION SYSTEM

(71) Applicant: TOYOTA JIDOSHA KABUSHIKI KAISHA, Toyota (JP)

(72) Inventors: Yuma Miyamoto, Miyoshi (JP); Yukinori Murakami, Toyota (JP); Takashi Fukai, Obu (JP); Akinori Kawamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 18/676,588

(22) Filed: May 29, 2024

(65) Prior Publication Data

US 2025/0076913 A1 Mar. 6, 2025

(30) Foreign Application Priority Data

Sep. 5, 2023 (JP) ................................ 2023-143553

(51) Int. Cl.
*G05F 1/67* (2006.01)

(52) U.S. Cl.
CPC ..................................... *G05F 1/67* (2013.01)

(58) Field of Classification Search
CPC ........ G05F 1/67; Y02E 10/56; H02J 2101/25; Y02B 10/10
See application file for complete search history.

(56) References Cited

U.S. PATENT DOCUMENTS

2020/0280207 A1 9/2020 Miyamoto et al.
2024/0106325 A1* 3/2024 Li ........................ H02M 3/156

FOREIGN PATENT DOCUMENTS

CN 111092484 A * 5/2020 ............. H02J 9/061
CN 109787270 B * 2/2023
JP 2020-141545 A 9/2020

* cited by examiner

*Primary Examiner* — Monica Lewis
*Assistant Examiner* — Jye-June Lee
(74) *Attorney, Agent, or Firm* — SoraIP, Inc.

(57) ABSTRACT

A control device performs: searching for a maximal efficiency voltage which is an output voltage of the first converter at which the output power of the first converter becomes maximal; storing the maximal efficiency voltage obtained by the searching; performing a voltage adjustment process of changing the output voltage of the first converter in a direction in which the output power of the first converter is increased by using the maximal efficiency voltage as an initial value; changing the output voltage of the first converter to the maximal efficiency voltage at that time when the correspondence relationship between the output voltage of the first converter and the output power corresponding to the output voltage of the solar panel is changed during the voltage adjustment process; and performing the voltage adjustment process again with the output voltage of the first converter after the change as a new initial value.

3 Claims, 3 Drawing Sheets

CONTROL DEVICE FOR SOLAR POWER GENERATION SYSTEM

CROSS-REFERENCE TO RELATED APPLICATION

This application claims priority to Japanese Patent Application No. 2023-143553 filed on Sep. 5, 2023 incorporated herein by reference in its entirety.

BACKGROUND

1. Technical Field

The present disclosure relates to control devices for solar power generation systems.

2. Description of Related Art

A vehicle disclosed in Japanese Unexamined Patent Application Publication No. 2020-141545 (JP 2020-141545 A) includes solar panels, direct current to direct current (DC-to-DC) converters, and control devices. Each solar panel generates electricity when sunlight hits it. Each solar panel outputs the generated power to a corresponding one of the DC-to-DC converters. Each DC-to-DC converter converts the output voltage of a corresponding one of the solar panels and outputs the converted voltage.

Each control device controls the output voltage of a corresponding one of the DC-to-DC converters. At this time, the control device determines the output voltage by a so-called hill-climbing method. For example, in the hill-climbing method, the control device gradually increases the output voltage. At this time, when a condition that output power increases as a result of increasing the output voltage continues to be satisfied, the control device continues to increase the output voltage. On the other hand, when this condition is no longer satisfied, the control device changes the direction in which the control device changes the output voltage. The control device then gradually decreases the output voltage. Similarly, the control device changes the direction in which the control device changes the output voltage, according to whether this condition is satisfied. By repeating this control, the control device can cause the output voltage of the DC-to-DC converter to follow the voltage at which the output power of the DC-to-DC converter becomes maximal.

SUMMARY

In a technique of controlling a DC-to-DC converter by the hill-climbing method such as the technique described in JP 2020-141545 A, there are cases where the surroundings of a solar panel suddenly change. For example, the amount of solar radiation sometimes changes suddenly. In this case, the output voltage of the solar panel may suddenly change. The correspondence between the output voltage and output power of the DC-to-DC converter may suddenly change accordingly. When controlling the output voltage of the DC-to-DC converter by the hill-climbing method in such a situation, it takes time for the output voltage of the DC-to-DC converter to reach the voltage at which the output power of the DC-to-DC converter becomes maximal.

A control device for a solar power generation system that solves the above problem is applied to a solar power generation system including a solar panel and a DC-to-DC converter configured to convert an output voltage of the solar panel and output the converted voltage. The control device is configured to: perform a scanning process of searching for a maximal efficiency voltage, the maximal efficiency voltage being an output voltage of the DC-to-DC converter at which output power of the DC-to-DC converter becomes maximal within a predetermined range; store the maximal efficiency voltage obtained by the scanning process; after the scanning process, perform a voltage adjustment process of changing the output voltage of the DC-to-DC converter in such a direction that the output power of the DC-to-DC converter increases by using the maximal efficiency voltage as an initial value; during the voltage adjustment process, determine whether correspondence between the output voltage of the DC-to-DC converter and the output power of the DC-to-DC converter according to the output voltage of the solar panel has changed; as soon as determination is made that the correspondence has changed, change the output voltage of the DC-to-DC converter to the maximal efficiency voltage; and perform the voltage adjustment process again by using the changed output voltage of the DC-to-DC converter as a new initial value.

According to the above technical idea, the output voltage of the DC-to-DC converter is more likely to be quickly returned to the voltage at which the output power of the DC-to-DC converter become maximal when the correspondence between the output voltage and output power of the DC-to-DC converter has changed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration

Figure 1:
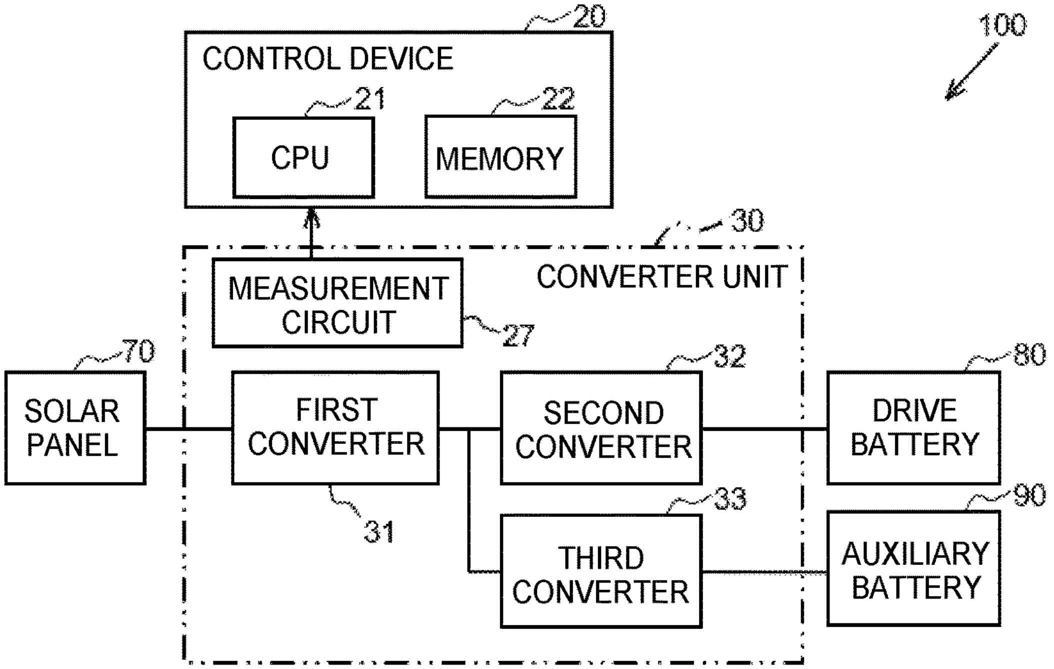
FIG. 1 is a schematic configuration diagram of a vehicle.

Hereinafter, an embodiment of a control device for a solar power generation system will be described with reference to the drawings. As illustrated in FIG. 1, the vehicle 100 includes a solar panel 70, a converter unit 30, a drive battery 80, an auxiliary battery 90, and a control device 20.

The solar panel 70 is formed by arranging a plurality of solar cells that generate electric power by irradiation with sunlight into a panel shape. The solar panel 70 is installed on, for example, a roof of the vehicle 100. The solar panel 70 may be installed on a bonnet of the vehicle 100.

The converter unit 30 supplies the generated electric power of the solar panel 70 to the drive battery 80 and the auxiliary battery 90. Details of the converter unit 30 will be described later.

The drive battery 80 is a secondary battery. The drive battery 80 stores electric power supplied from the converter unit 30. The drive battery 80 supplies electric power to a drive system (not shown) mounted on the vehicle 100. The drive train of the vehicle 100 includes one or more motors for driving the vehicle 100.

The auxiliary battery 90 is a secondary battery. The auxiliary battery 90 stores electric power supplied from the converter unit 30. The auxiliary battery 90 supplies electric power to an auxiliary system (not shown) mounted on the vehicle 100. The auxiliary equipment system of the vehicle 100 includes one or more auxiliary equipment. The auxiliary machine is, for example, an electric oil pump, a navigation system, or a lamp.

Converter Unit

The converter unit 30 includes a first DC-to-DC converter 31, a second DC-to-DC converter 32, a third DC-to-DC converter 33, and a measurement circuit 27. The converter unit 30 constitutes a solar power generation system together with the solar panel 70. DC-to-DC converters are voltage converters that step down or step up the DC voltage. In the following description of each DC-to-DC converter, DC-to-DC converters will be simply referred to as converters. For example, the first DC-to-DC converter 31 is referred to as a first converter 31.

The first converter 31 is connected to the solar panel 70. The first converter 31 converts an output voltage of the solar panel 70, which is an input voltage, into a voltage based on an instruction from the control device 20, and outputs the voltage.

The second converter 32 is interposed between the first converter 31 and the drive battery 80. The second converter 32 converts the voltage output from the first converter 31 into a voltage within a predetermined range and outputs the voltage to the drive battery 80.

The third converter 33 is interposed between the first converter 31 and the auxiliary battery 90. The third converter 33 converts the voltage output from the first converter 31 into a voltage within a predetermined range and outputs the voltage to the auxiliary battery 90. The voltage output by the third converter 33 is lower than the voltage output by the second converter 32.

The measurement circuit 27 repeatedly detects the output voltage of the first converter 31 and the output current of the first converter 31. The measurement circuit 27 repeatedly outputs a signal corresponding to the output voltage and the output current detected by itself to the control device 20.

Control Device

The control device 20 includes a CPU 21 and a memory 22. The memory 22 stores in advance various programs in which processes to be executed by CPU 21 are described. CPU 21 controls the first converter 31, the second converter 32, and the third converter 33 by executing programs stored in the memory 22. In controlling the first converter 31, CPU 21 sets a voltage instruction value Q related to the output voltage of the first converter 31. Then, CPU 21 controls the first converter 31 so as to realize the output voltage of the voltage instruction value Q. There are three types of memory 22: RAM, ROM, and electrically rewritable non-volatile types. In the present embodiment, these three types are collectively referred to as a memory 22.

Figure 2:
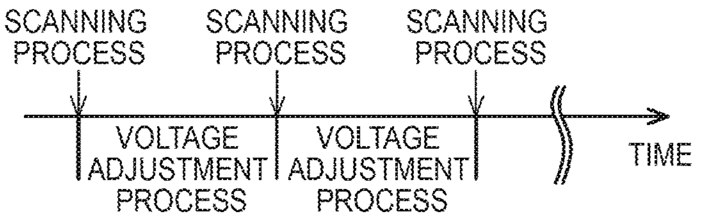
FIG. 2 is a time chart illustrating execution timings of a scanning process and a voltage adjustment process.

CPU 21 is activated as needed while the start switch of the vehicle 100 is turned on as well as while the start switch is turned off. The start switch is a switch for switching on/off of the main system of the vehicle 100. CPU 21 performs a first converter process for controlling the first converter 31 while it is activated. There are two types of first converter processes: scanning process and voltage adjustment process. As shown in FIG. 2, CPU 21 alternately performs the scanning process and the voltage adjustment process. CPU 21 performs the scanning process quickly within a very short period of time, e.g., less than one second. After that, CPU 21 performs the voltage adjustment process for a predetermined period of time, for example, one minute.

Figure 3:
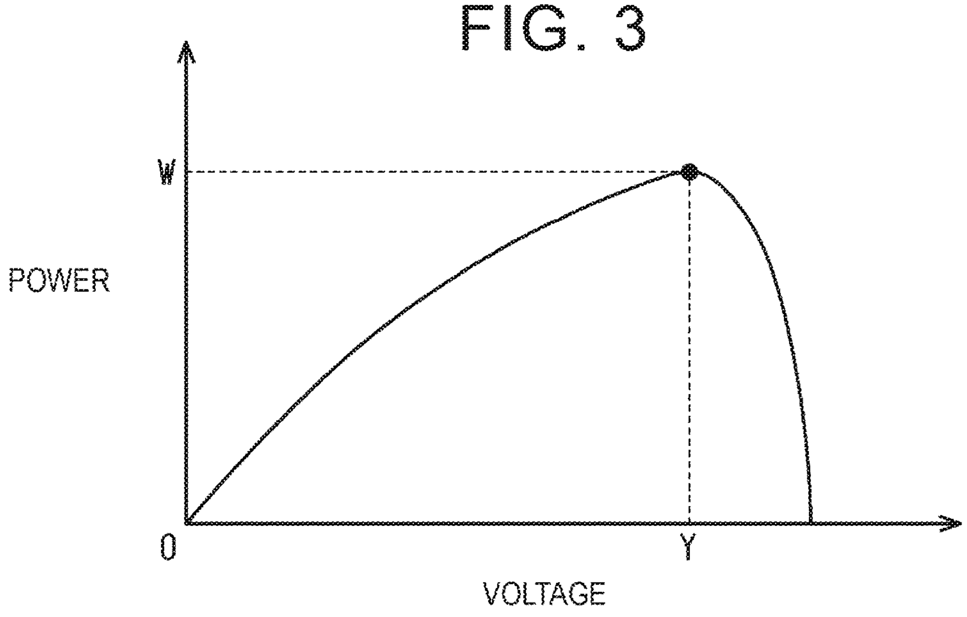
FIG. 3 is a diagram illustrating an exemplary PV characteristic line.

A PV characteristic line, which is a premise of the first converter process, will be described. As shown in FIG. 3, an orthogonal coordinate in which the output voltage of the first converter 31 is taken as the X-axis and the output power of the first converter 31 is taken as the Y-axis is considered. In this Cartesian coordinate, the first converter 31 can be realized in accordance with the current power generation state of the solar panel 70 and thus the output voltage of the solar panel 70, and the correspondence relation between the output voltage of the first converter 31 and the output power of the first converter 31 is a PV characteristic line. PV characteristic line is basically a mountain profile. That is, PV characteristic lines has a distribution with a local maximum at which the output power of the first converter 31 changes from increasing to decreasing. Note that the shapes indicated by PV characteristic lines differ depending on the conditions in which the solar panel 70 is placed, for example, the amount of solar radiation. PV characteristic lines may have a distribution with a plurality of local maximums at which the output power of the first converter 31 changes from increasing to decreasing. In the following description, the correspondence relationship between the output voltage of the first converter 31 and the output power of the first converter 31 is referred to as a specific correspondence relationship.

Scanning Process

The scanning process will be described. In the scanning process, CPU 21 searches for the maximal efficiency voltage Y by scanning the output voltage of the first converter 31 over the entire region within the scanning target region. The maximal efficiency voltage Y is an output voltage of the first converter 31 at which the output power of the first converter 31 becomes maximal within the scanning target range. That is, in the scanning process, CPU 21 monitors the output power of the first converter 31 obtained at the respective output voltages while gradually changing the output voltage of the first converter 31 within the scanning target area. Then, as shown in FIG. 3, the CPU 21 specifies a set of a maximal power value W that is a value at which the output power of the first converter 31 becomes maximal and a maximal efficiency voltage Y that is an output voltage of the first converter 31 corresponding to the maximal power value W. As described above, the PV characteristic line may have a plurality of local maximums of the output power of the first converter 31. Here, CPU 21 specifies a plurality of sets of the maximal efficiency voltage Y and the maximal power value W. CPU 21 can calculate the output power of the first converter 31 by multiplying the output current of the first converter 31 acquired from the measurement circuit 27 by the output voltage.

The scanning target range is an output voltage range in which zero is the lower limit value and the characteristic voltage is the upper limit value. The characteristic voltage has the following values. Now, it is assumed that the output-voltage of the first converter 31 is increased from zero in PV characteristic line. At this time, the output power of the first converter 31 increases or decreases from zero, and then returns to zero again. The output voltage of the first converter 31 when the output power of the first converter 31 returns to zero is a characteristic voltage. The scanning target range corresponds to a predetermined range.

Storage Process

CPU 21 also performs a storage process of storing the data obtained by the scanning process in association with the scanning process. This storage process will be described. Here, when CPU 21 performs the scanning process, there are a first case in which the PV characteristic line has only one local maximum of the output power of the first converter 31, and a second case in which the PC characteristic line has a plurality of local maximums of the output power of the first converter 31. Hereinafter, a process performed by CPU 21 in the storage process will be described for each case.

First, the first case will be described. As described above, in the first case, only one set of the maximal efficiency voltage Y and the maximal power value W is specified by CPU 21 in the scanning process. Then, CPU 21 stores the maximal efficiency voltage Y obtained by the scanning process as the most recent efficiency voltage Ynew in the memory 22. At this time, CPU 21 overwrites the previously stored most recent efficiency voltage Ynew with the new most recent efficiency voltage Ynew.

CPU 21 also does the following, apart from storing the most recent efficiency voltage Ynew: CPU 21 determines whether or not the maximal power value W corresponding to the maximal efficiency voltage Y obtained by the scanning process is equal to or greater than the first threshold U1. When the maximal power value W is equal to or greater than the first threshold U1, CPU 21 stores the maximal efficiency voltage Y obtained by the scanning process as the first efficiency voltage Y1 in the memory 22. At this time, CPU 21 overwrites the previously stored first efficiency voltage Y1 with the new first efficiency voltage Y1. When the maximal power value W is less than the first threshold U1, CPU 21 retains the previously stored first efficiency voltage Y1 in the memory 22. The first threshold U1 will be described later.

CPU 21 determines whether the maximal power value W corresponding to the maximal efficiency voltage Y obtained by the scanning process is equal to or less than the second threshold U2. When the maximal power value W is equal to or less than the second threshold U2, CPU 21 stores the maximal efficiency voltage Y obtained by the scanning process as the second efficiency voltage Y2 in the memory 22. At this time, CPU 21 overwrites the previously stored second efficiency voltage Y2 with the new second efficiency voltage Y2. When the maximal power value W is greater than the second threshold U2, CPU 21 retains the previously stored second efficiency voltage Y2 in the memory 22. The second threshold U2 will be described later.

Next, the second case will be described. In the second case, there are a plurality of sets of maximal efficiency voltage Y and maximal power value W specified by CPU 21 in the scanning process. In this second case, CPU 21 specifies the maximum value among the plurality of maximal power values W obtained by the scanning process as the maximal maximum value. Then, CPU 21 stores the maximal efficiency voltage Y corresponding to the maximal maximum value in the memory 22 as the most recent efficiency voltage Ynew. At this time, CPU 21 overwrites the previously stored most recent efficiency voltage Ynew with the new most recent efficiency voltage Ynew.

CPU 21 also does the following, apart from storing the most recent efficiency voltage Ynew: CPU 21 determines whether the maximal maximum value is equal to or greater than the first threshold U1. When the maximal maximum value is equal to or larger than the first threshold U1, CPU 21 stores the maximal efficiency voltage Y corresponding to the maximal maximum value as the first efficiency voltage Y1 in the memory 22. At this time, CPU 21 overwrites the previously stored first efficiency voltage Y1 with the new first efficiency voltage Y1. When the maximal maximum value is less than the first threshold U1, CPU 21 retains the previously stored first efficiency voltage Y1 in the memory 22.

The CPU 21 determines whether the maximal maximum value is equal to or less than the second threshold U2. When the maximal maximum value is equal to or smaller than the second threshold U2, CPU 21 stores the maximal efficiency voltage Y corresponding to the maximal maximum value as the second efficiency voltage Y2 in the memory 22. At this time, CPU 21 overwrites the previously stored second efficiency voltage Y2 with the new second efficiency voltage Y2. When the maximal maximum value is greater than the second threshold U2, CPU 21 causes the memory 22 to hold the previously stored second efficiency voltage Y2 as it is. Here, when the maximal maximum value is larger than the second threshold U2, CPU 21 may determine whether the maximal power values W other than the maximal maximum value among the plurality of maximal power values W is equal to or smaller than the second threshold U2. For example, CPU 21 specifies the minimum value among the plurality of maximal power values W as the maximal minimum value. Then, CPU 21 determines whether the maximal minimum value is equal to or less than the second threshold U2. When the maximal minimum value is equal to or smaller than the second threshold U2, CPU 21 stores the maximal efficiency voltage Y corresponding to the maximal minimum value as the second efficiency voltage Y2 in the memory 22. In this way, by making the maximal efficiency voltage Y corresponding to the maximal power value W other than the maximal maximum value candidates for the second efficiency voltage Y2, it is possible to increase the chance of updating the second efficiency voltage Y2.

In the above-described storage process, CPU 21 of the present embodiment stores the most recent efficiency voltage Ynew, the first efficiency voltage Y1, and the second efficiency voltage Y2 in the nonvolatile memories. The first threshold U1 and the second threshold U2 will be described. For example, it is assumed that various PV characteristic lines having different conditions in which the solar panel 70 is placed, such as different amounts of sunlight, are subjected to statistical analysis on the frequency of occurrence of the maximal power value W. In this statistic, a range of values that can be regarded as having a relatively high frequency of occurrence of the maximal power value W is referred to as a normal occurrence range. The first threshold U1 is determined in advance to be slightly larger than the upper limit of the normal appearance range. The second threshold U2 is determined in advance to be slightly smaller than the lower limit of the normal appearance range. The first threshold U1 and the second threshold U2 of the present embodiment are defined by using the mean value and the standard-deviation with respect to the maximal power value W obtained from the above statistic of the maximal power value W. The first threshold U1 is determined in advance as a value obtained by adding one time the standard deviation to the mean value of the maximal power value W. The second threshold U2 is determined in advance as a value obtained by subtracting one time the standard deviation from the mean value of the maximal power value W. The memory 22 stores the first threshold U1 and the second threshold U2 in advance.

Voltage Adjustment Process

Figure 4:
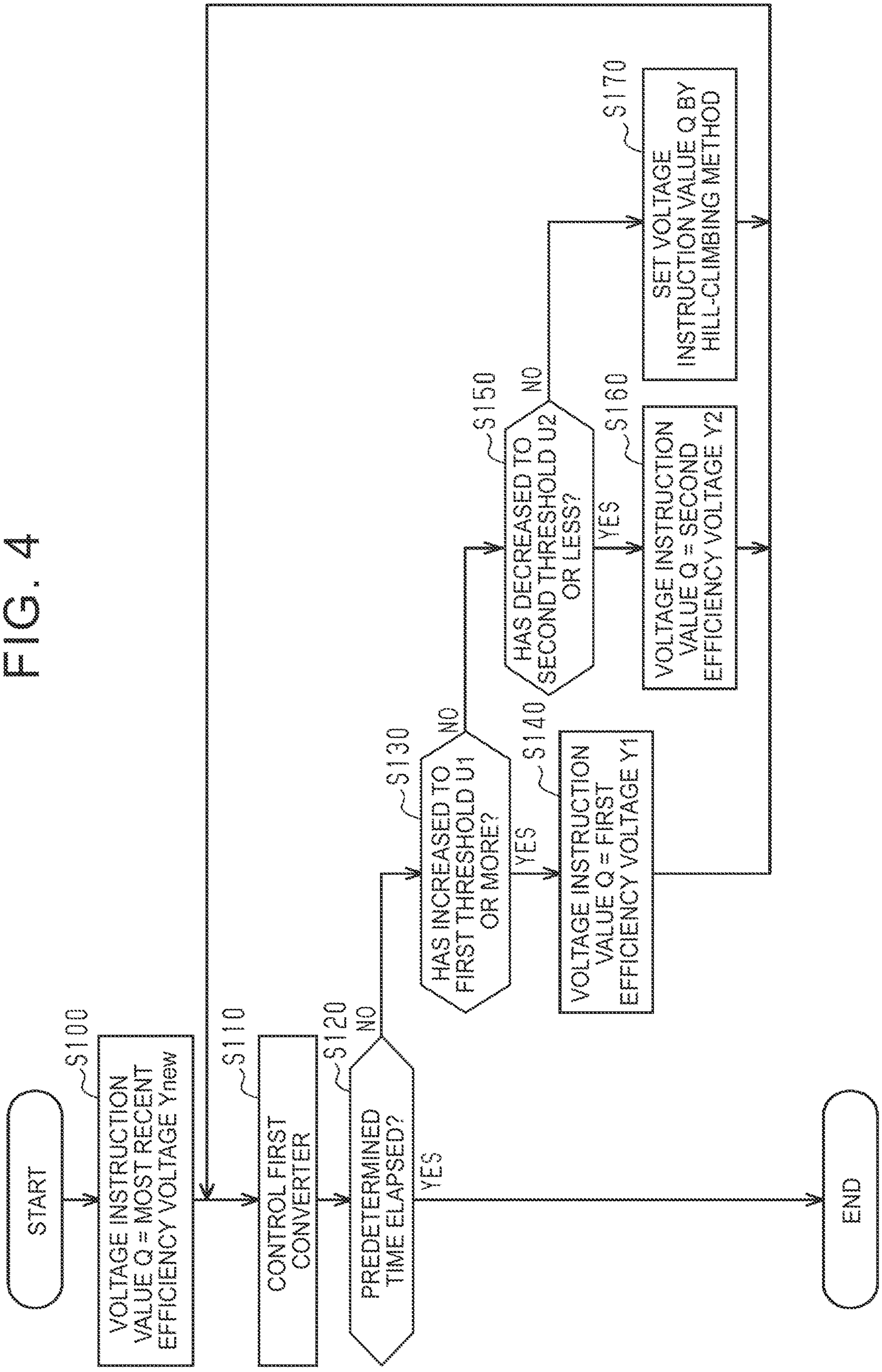
FIG. 4 is a flowchart illustrating a procedure of the voltage adjustment processing.

A specific procedure of the voltage adjustment process will be described. As shown in FIG. 4, when CPU 21 starts the voltage adjustment process, it first performs S100 process. In S100, CPU 21 sets the most recent efficiency voltage Ynew stored in the memory 22 as the voltage instruction value Q. By this step S100, the CPU 21 is set to the most recent efficiency voltage Ynew as an initial value for controlling the output voltage of the first converter 31 in the voltage adjustment process. Thereafter, CPU 21 proceeds to S110.

In S110, CPU 21 controls the first converter 31 so that the output voltage of the first converter 31 matches the voltage instruction value Q currently set. Then, CPU 21 calculates the output power of the first converter 31 when the output voltage of the first converter 31 is controlled to coincide with the voltage instruction value Q. As a result, CPU 21 acquires the output power of the first converter 31 according to the voltage instruction value Q. When CPU 21 acquires the output power of the first converter 31, the process proceeds to S120. As described above, CPU 21 can calculate the output power of the first converter 31 based on the detection result of the measurement circuit 27.

In S120, CPU 21 determines whether or not the elapsed time from the beginning of the voltage adjustment process has reached a predetermined time. The predetermined time is determined in advance as a length of time for which one voltage adjustment process is continued. As described above, the predetermined time is, for example, 1 minute. When S120 determination is NO, CPU 21 advances the process to S130.

In S130, CPU 21 makes a first determination to determine whether the output power of the first converter 31 has increased from less than the first threshold U1 to greater than or equal to the first threshold U1 within a predetermined control period. Hereinafter, this first determination may be referred to as a sudden change determination. The sudden change determination is a determination as to whether or not the specific correspondence relationship, which is a correspondence relationship between the output voltage of the first converter 31 and the output power, has changed. The situation in which the sudden change determination is affirmatively determined in S130 is a situation in which, for example, the output power of the first converter 31 has suddenly increased due to a sudden increase in the amount of solar radiation to the solar panel 70 as compared with the situation in which the most recent efficiency voltage Ynew is detected. Note that the above-described control period is a length of one cycle when CPU 21 repeats S110 process. The control period is, for example, a scale of less than one second. As a specific process of S130, CPU 21 determines whether the first condition is satisfied by referring to the most recent power and the previous power of the first converter 31. The process of S110 is referred to as a power acquiring process. The most recent power is the output power of the first converter 31 obtained by the most recent power acquisition process. The previous power is the output power obtained by the power acquisition process performed one cycle before the most recent power acquisition process. The first condition is that the previous power is less than the first threshold U1 and the most recent power is equal to or greater than the first threshold U1. CPU 21 determines that the output power of the first converter 31 has increased to be equal to or higher than the first threshold U1 when the first condition is satisfied (S130: YES). Then, CPU 21 determines that the specified correspondence has changed as a consequence of the sudden change determination. In this instance, CPU 21 proceeds to S140. Then, in S140, CPU 21 sets the first efficiency voltage Y1 stored in the memory 22 as the voltage instruction value Q. Thereafter, CPU 21 returns to S110 process.

On the other hand, in S130, if the first condition is not satisfied, CPU 21 determines that the output power of the first converter 31 has not increased to the first threshold U1 or more (S130: NO). Then, CPU 21 determines that the specified correspondence has not changed as a result of the sudden change determination. In this instance, CPU 21 proceeds to S150.

In S150, CPU 21 makes a second determination to determine whether the output power of the first converter 31 has decreased from a value greater than the second threshold U2 to a value less than or equal to the second threshold U2 within the control period. Hereinafter, the second determination may be referred to as a sudden change determination. The situation in which the sudden change determination is affirmatively determined in S150 is a situation in which, for example, the output power of the first converter 31 is suddenly decreased by, for example, a sudden decrease in the amount of solar radiation to the solar panel 70 as compared with the situation in which the most recent efficiency voltage Ynew is detected. Like S130, CPU 21 performs the second determination by referring to the most recent power and the previous power of the first converter 31. Specifically, CPU 21 determines whether the most recent power and the previous power of the first converter 31 satisfy the second criterion. The second condition is that the previous power is greater than the second threshold U2 and the most recent power is less than or equal to the second threshold U2. CPU 21 determines that the output power of the first converter 31 has decreased below the second threshold U2 when the second condition is satisfied (S150: YES). Then, CPU 21 determines that the specified correspondence has changed as a consequence of the sudden change determination. In this instance, CPU 21 proceeds to S160. Then, in S160, CPU 21 sets the second efficiency voltage Y2 stored in the memory 22 as the voltage instruction value Q. Thereafter, CPU 21 returns to S110 process.

On the other hand, in S150, if the second condition is not satisfied, CPU 21 determines that the output power of the first converter 31 has not decreased to the second threshold U2 or less (S150: NO). Then, CPU 21 determines that the specified correspondence has not changed as a result of the sudden change determination. In this instance, CPU 21 proceeds to S170.

In S170, CPU 21 sets the voltage instruction value Q by a so-called hill-climbing method. Specifically, CPU 21 sets a new voltage instruction value Q by adding or subtracting a predetermined adjusted value to or from the previous indication value which is the voltage instruction value Q set last time. The adjustment value is a positive value. The adjustment value is determined in advance as an optimum value of the amount of change per one time of the output voltage of the first converter 31. The memory 22 stores the adjustment value in advance. CPU 21 calculates the voltage instruction value Q by changing the previous indication value in such a manner that the output power of the first converter 31 increases. The direction in which the output power increases is either a direction in which the voltage instruction value Q increases with respect to the previous indication value or a direction in which the voltage instruction value Q decreases with respect to the previous indication value. CPU 21 refers to the most recent power and the previous power of the first converter 31 to determine the direction in which the voltage instruction value Q is changed. When the most recent power of the first converter

31 is equal to or higher than the previous power, CPU 21 sets the direction in which the voltage instruction value Q is changed to the same direction as the direction in which S170 is executed last time. On the other hand, when the most recent power of the first converter 31 is less than the previous power, CPU 21 reverses the direction in which the voltage instruction value Q is changed from the direction in which S170 was executed last time. When a direction in which the voltage instruction value Q is changed is determined, CPU 21 sets a value in which the previous indication value is changed by the adjusting value in the direction to a new voltage instruction value Q. When CPU 21 executes S170 process for the first time after executing any one of the processes of S100, S140 and S160, a value obtained by adding an adjusting value to the voltage instruction value Q determined in these processes is set as a new voltage instruction value Q. CPU 21 returns to S110 process when the voltage instruction value Q is set.

As described above, CPU 21 repeats the setting of the voltage instruction value Q through S140, S160 or S170 and the control of the first converter 31 by S110. When the determination of S120 becomes YES during this repetition, that is, when the elapsed time from the beginning of the voltage adjustment process reaches a predetermined time, CPU 21 ends the series of processes of the voltage adjustment process. After that, as shown in FIG. 2, CPU 21 executes the scanning process and then starts the voltage adjustment process again.

Operations of Embodiment

In the description of the functions and effects of the embodiment described below, the maximal efficiency voltage Y refers to the maximal efficiency voltage Y corresponding to the maximum value of the output power of the first converter 31.

Now, it is assumed that CPU 21 is executing the voltage adjustment process. Then, it is assumed that S120, S130 and S150 judgement are all NO. Here, CPU 21 repeats setting the voltage instruction value Q by the hill-climbing method in S170 and controlling the first converter 31 in S110. For example, when CPU 21 sets the voltage instruction value Q at the first timing T1, it is assumed that CPU 21 sets a value obtained by adding the adjusted value to the previous indicated value to a new voltage instruction value Q. It is assumed that, when CPU 21 controls the first converter 31 based on the voltage instruction value Q, the most recent power of the first converter 31 becomes larger than the previous power. Here, when setting the voltage instruction value Q at the subsequent second timing T2, CPU 21 sets the direction in which the voltage instruction value Q is changed to the same direction as the first timing T1. That is, CPU 21 also sets the value obtained by adding the adjusted value to the previous indicated value to the new voltage instruction value Q at the second timing T2. CPU 21 controls the first converter 31 based on the voltage instruction value Q. At this time, it is assumed that the most recent power of the first converter 31 becomes smaller than the previous power. In this instance, when setting the voltage instruction value Q at the subsequent third timing T3, CPU 21 sets the direction in which the voltage instruction value Q is changed to the direction opposite to the previous direction. That is, in the third timing T3, CPU 21 sets a value obtained by subtracting the adjusted value from the previous indicated value to a new voltage instruction value Q. CPU 21 controls the first converter 31 based on the voltage instruction value Q. By repeating such a process, CPU 21 changes the output voltage of the first converter 31 as a whole in the voltage adjustment process in such a manner that the output power of the first converter 31 increases.

Figure 5:
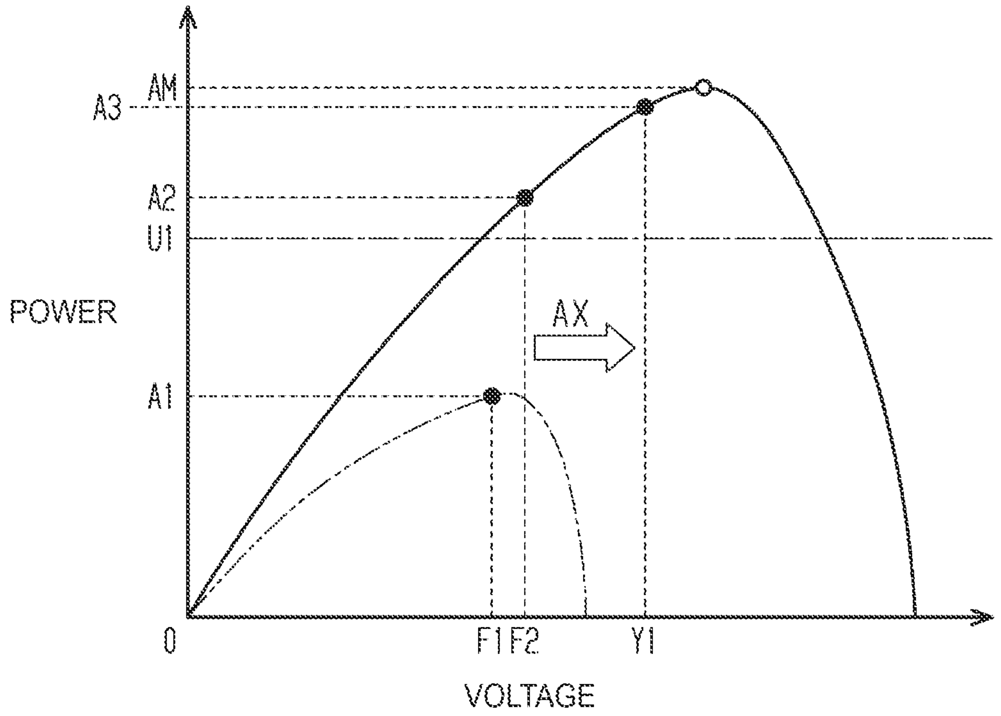
FIG. 5 is a diagram illustrating an exemplary case where a PV characteristic line suddenly changes.

Now, during the execution of the voltage adjustment process, the specific correspondence relationship related to the first converter 31 may suddenly change. For example, as indicated by the two-dot chain line in FIG. 5, it is assumed that, in any fourth timing T4 during the voltage adjustment process, the maximum value of the output power in PV characteristic line is less than the first threshold U1. Then, it is assumed that the output power A1 of the first converter 31 corresponding to the voltage instruction value F1 determined by the hill-climbing method at this time is less than the first threshold U1. Further, it is assumed that, in the fifth timing T5 after this, the specified correspondence relation suddenly changes as indicated by the solid line in FIG. 5. Then, it is assumed that the maximum power AM in PV characteristic line after the sudden change is larger than the first threshold U1. Here, immediately after the sudden change of PV characteristic line, CPU 21 determines the voltage instruction value F2 by the hill-climbing method following the fourth timing T4. The output power A2 of the first converter 31 corresponding to the voltage instruction value F2 determined at this time is a value reflecting PV characteristic line after the sudden change. Now, it is assumed that the output power A2 is larger than the first threshold U1, reflecting PV characteristic line after the sudden change. When the output power A2 is acquired, CPU 21 determines that the output power of the first converter 31 has increased from less than the first threshold U1 to the first threshold U1 or more in the first determination as the sudden change determination (S130: YES). At this point, as indicated by the arrow AX in FIG. 5, CPU 21 changes the voltage instruction value Q from the previous instruction value F2 to the first efficiency voltage Y1 (S140). Then, CPU 21 sets the voltage instruction value Q by the hill-climbing method again using the first efficiency voltage Y1, which is the changed voltage instruction value Q, as a new initial value. That is, CPU 21 continues the voltage adjustment process. It should be noted that PV characteristic lines, the output power, and the voltage instruction values shown in FIG. 5 are examples for explaining the operation of the present embodiment, and do not necessarily coincide with the actual one.

Here, it is highly likely that PV characteristic lines have similar distributions under the first situation where the condition that the maximum value of the output power of the first converter 31 in the PV characteristic line is equal to or larger than the first threshold U1 is satisfied. Under the first situation, it is highly likely that the maximal efficiency voltage Y corresponding to the maximum value always has the same value. In particular, if the first situations appear at two relatively close timings, it is highly likely that the maximal efficiency voltage Y becomes the same level. Here, the first efficiency voltage Y1 stored in the memory 22 can be said to be the maximal efficiency voltage Y specified in the first situation that appears at a timing closest to the current time. When the determination result of the first determination is YES in S130, the current state is the first state. That is, when the determination result of the first determination is YES, the maximal efficiency voltage Y at the present time is highly likely to be close to the first efficiency voltage Y1 stored in the memory 22. For this reason, when the (S130: YES) voltage instruction value Q is changed to the first efficiency voltage Y1 when the determination result of the first determination is YES as in the present embodiment (S140), the following is highly likely to be realized. That is, as shown in FIG. 5, the output power A3 of the first converter 31 corresponding to the first efficiency voltage Y1 which is the changed voltage instruction value Q is highly likely to be a value close to the maximum power AM in PV characteristic line after the sudden change.

Figure 6:
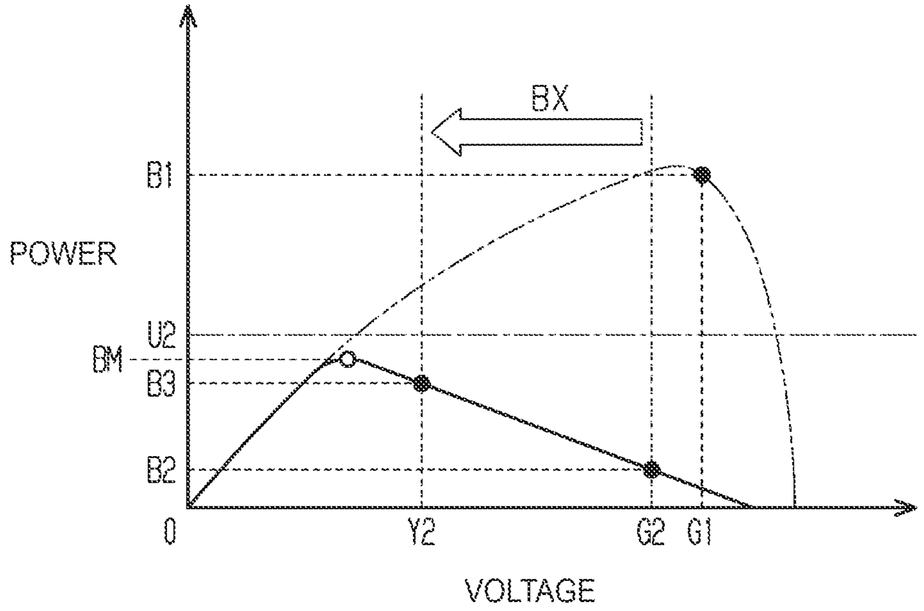
FIG. 6 is a diagram illustrating an exemplary case where a PV characteristic line suddenly changes.

In a case where the specific correspondence relationship related to the first converter 31 suddenly changes, the following may be possible. For example, as indicated by the two-dot chain line in FIG. 6, it is assumed that the maximum value of PV characteristic line is larger than the second threshold U2 in any sixth timing T6 in which the voltage adjustment process is being executed. Then, it is assumed that the output power B1 of the first converter 31 corresponding to the voltage instruction value G1 determined by the hill-climbing method at this time is larger than the second threshold U2. Further, in the seventh timing T7 after this, it is assumed that the specified correspondence has suddenly changed as indicated by the solid line in FIG. 6. Then, it is assumed that the maximum power BM in PV characteristic line after the sudden change is smaller than the second threshold U2. In the same manner as described in FIG. 5, CPU 21 determines the voltage instruction value G2 at the next-timing in the hill-climbing method at this point. Then, the output power B2 of the first converter 31 corresponding to the voltage instruction value G2 is a value reflecting PV characteristic line after the sudden change. Now, it is assumed that the output power B2 is smaller than the second threshold U2. When the output power B2 is acquired, CPU 21 determines that the output power of the first converter 31 has decreased from a value larger than the second threshold U2 to a value smaller than or equal to the second threshold U2 in the second determination that is the sudden change determination (S150: YES). At this point, as indicated by the arrow BX in FIG. 6, CPU 21 changes the voltage instruction value Q from the previous instruction value G2 to the second efficiency voltage Y2 (S160). Then, CPU 21 sets the voltage instruction value Q by the hill-climbing method again using the second efficiency voltage Y2, which is the changed voltage instruction value Q, as a new initial value. That is, CPU 21 continues the voltage adjustment process. It should be noted that PV characteristic lines, output powers, and voltage instruction values shown in FIG. 6 are merely an example illustrating the functions of the present embodiment, and do not necessarily coincide with the actual values.

Here, in the second situation where the condition that the maximum value of the output power of the first converter 31 is equal to or less than the second threshold U2 is satisfied in PV characteristic line as in the case described in the first situation, it is highly likely that the maximal efficiency voltage Y corresponding to the maximum value will be the same value at all times. When the determination result of the second determination is YES in S150, it is highly likely that the current state is the second state. At the same time, when the determination result of the second determination becomes YES, it is highly likely that the current maximal efficiency voltage Y is close to the second efficiency voltage Y2 stored in the memory 22. Therefore, when the voltage instruction value Q is changed to the second efficiency voltage Y2 when the result of the second determination is YES (S150: YES) as in the present embodiment (S160), the following is highly likely to be realized. That is, as shown in FIG. 6, it is highly likely that the output power B3 of the first converter 31 corresponding to the second efficiency voltage Y2, which is the voltage instruction value Q after the change, becomes a value close to the maximum power BM in PV characteristic line after the sudden change.

Effects of Embodiment (1) When it is determined that the specified correspondence has suddenly changed, CPU 21 changes the output voltage of the first converter 31 to the maximal efficiency voltage Y stored in the past at that time. When the output voltage of the first converter 31 is changed to the maximal efficiency voltage Y, compared with the case where the control of the first converter 31 by the hill-climbing method is continued as it is, it is highly likely that the time required for bringing the output voltage of the first converter 31 closer to the maximal efficiency voltage Y after the specific correspondence suddenly changes can be shortened. Therefore, in the configuration of the present embodiment, when there is a sudden change in the specific correspondence, the output voltage of the first converter 31 can be returned to the vicinity of the maximal efficiency voltage Y at an earlier timing to control the first converter 31.

(2) As described in the operation of the above embodiment, when the determination result of the first determination is YES, the maximal efficiency voltage Y at that time is likely to be close to the first efficiency voltage Y1. Therefore, as in the present embodiment, by changing the first efficiency voltage Y1 at that time when the determination result of the first determination is YES, CPU 21, the output voltage of the first converter 31, the maximal efficiency voltage Y after the particular correspondence suddenly changes It is likely to be brought close at once. This makes it easier to obtain the effect of returning the output voltage of the first converter 31 to the vicinity of the maximal efficiency voltage Y at an earlier timing as described in (1) above.

(3) As in (2), when the determination result of the second determination is YES, CPU 21 changes the voltage instruction value Q to the second efficiency voltage Y2 at that time, so that the output voltage of the first converter 31 is likely to be brought at once closer to the maximal efficiency voltage Y after the specified correspondence suddenly changes. This makes it easy to obtain the effects described in (1) as in (2) above.

Modifications

The above embodiment can be implemented with the following modifications. The above embodiments and the following modifications can be combined with each other within a technically consistent range to be implemented.

- The first threshold U1 is not limited to the above-described embodiment. The first threshold U1 is preferably a value suitable for capturing a sudden change in the specific correspondence with the specific correspondence having the maximal power value W larger than the normal time.
- The second threshold U2 is not limited to the exemplary embodiment described above. The second threshold U2 is preferably a value suitable for capturing a sudden change in the specific correspondence with the specific correspondence having the maximal power value W smaller than the normal time. The second threshold U2 is set to be smaller than the first threshold U1.
- The second determination may be abolished. At the same time, the second efficiency voltage Y2 may be eliminated. Further, the first determination may be abolished. At the same time, the first efficiency voltage Y1 may be eliminated. When the first determination and the second determination are abolished, a sudden change determination instead of the first determination and the second determination may be set as appropriate. The sudden change determination may be any determination as long as it can determine whether or not the specific correspondence has changed. For example, as the sudden change determination, it may be determined whether or not the amount of change in the output power from the previous power to the most recent power is larger than a predetermined determination value. When the change amount is larger than the determination value, it may be determined that the specific correspondence relationship has changed. When it is determined that the specified correspondence has changed, the voltage instruction value Q may be changed to the most recent efficiency voltage Ynew at that point in time. Even when the voltage instruction value Q is changed to the most recent efficiency voltage Ynew, compared with the case where the control of the first converter 31 by the hill-climbing method is continued as it is, it is highly likely that the time until the output voltage of the first converter 31 approaches the maximal efficiency voltage Y after the specified correspondence suddenly changes can be shortened.

The configuration of the solar power generation system is not limited to the example of the above-described embodiment. For example, the number of solar panels may be changed from the example of the above embodiment. In addition, the number of DC-to-DC converters may be changed in accordance with the magnitude of the required power, the number of power destinations, and the like. The solar power generation device may include at least one solar panel and a DC-to-DC converter that converts an output voltage of the solar panel into a voltage and outputs the converted voltage.

What is claimed is:

1. A control device for a solar power generation system, the solar power generation system including a solar panel and a direct current to direct current (DC-to-DC) converter configured to convert an output voltage of the solar panel and output the converted voltage, the control device being configured to perform a scanning process of searching for a maximal efficiency voltage, the maximal efficiency voltage being an output voltage of the DC-to-DC converter at which output power of the DC-to-DC converter becomes maximal within a predetermined range, store the maximal efficiency voltage obtained by the scanning process, after the scanning process, perform a voltage adjustment process of changing the output voltage of the DC-to-DC converter in such a direction that the output power of the DC-to-DC converter increases by using the maximal efficiency voltage as an initial value, during the voltage adjustment process, determine whether correspondence between the output voltage of the DC-to-DC converter and the output power of the DC-to-DC converter according to the output voltage of the solar panel has changed, as soon as determination is made that the correspondence has changed, change the output voltage of the DC-to-DC converter to the maximal efficiency voltage, and perform the voltage adjustment process again by using the changed output voltage of the DC-to-DC converter as a new initial value.

2. The control device according to claim 1, wherein the control device is configured to when the output power of the DC-to-DC converter corresponding to the maximal efficiency voltage obtained by the scanning process is equal to or larger than a predetermined first threshold, store the maximal efficiency voltage as a first efficiency voltage, when the output power of the DC-to-DC converter has changed from less than the first threshold to the first threshold or more during the voltage adjustment process, determine, as a result of the determination, that the correspondence has changed, and when the output power of the DC-to-DC converter has changed to the first threshold or more, change the output voltage of the DC-to-DC converter to the first efficiency voltage.

3. The control device according to claim 2, wherein the control device is configured to when the output power of the DC-to-DC converter corresponding to the maximal efficiency voltage obtained by the scanning process is equal to or less than a predetermined second threshold, store the maximal efficiency voltage as a second efficiency voltage, the second threshold being a value smaller than the first threshold, when the output power of the DC-to-DC converter has changed from more than the second threshold to the second threshold or less during the voltage adjustment process, determine, as a result of the determination, that the correspondence has changed, and when the output power of the DC-to-DC converter has changed to the second threshold or less, change the output voltage of the DC-to-DC converter to the second efficiency voltage.

* * * * *